J. G. HAYMAKER.
HOSE COUPLING.
APPLICATION FILED MAR. 7, 1911.
1,016,744.
Patented Feb. 6, 1912.
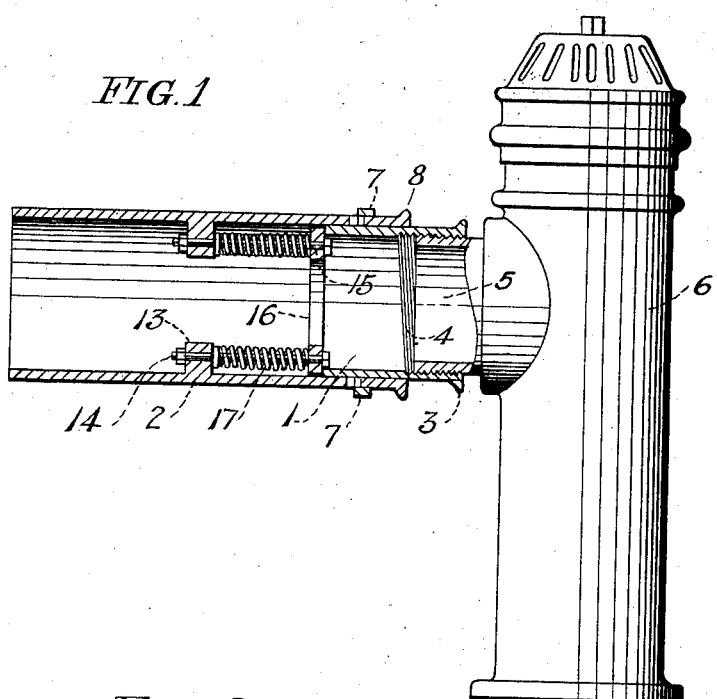
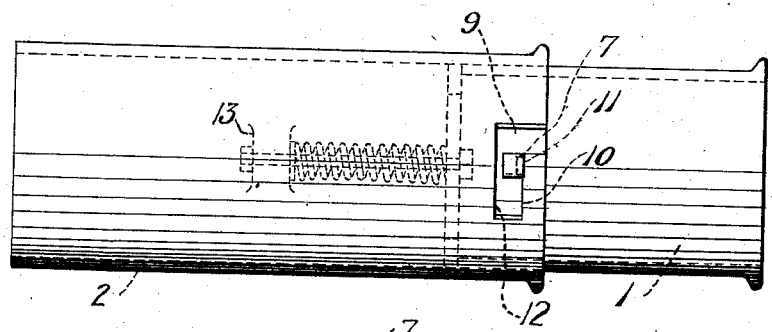
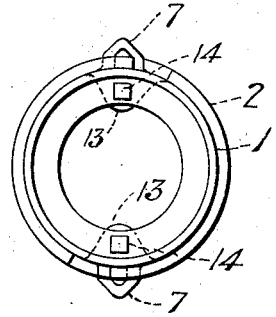
WITNESSES:
INVENTOR.
J. G. HAYMAKER.
BY
ATTORNEYS.

UNITED STATES PATENT OFFICE.

JAMES G. HAYMAKER, OF MINERVA, OHIO.

HOSE-COUPLING.

1,016,744.  Specification of Letters Patent.  Patented Feb. 6, 1912.

Application filed March 7, 1911. Serial No. 612,905.

*To all whom it may concern:*

Be it known that I, JAMES G. HAYMAKER, a citizen of the United States of America, residing at Minerva, in the county of Stark and State of Ohio, have invented certain new and useful Improvements in Hose-Couplers, of which the following is a specification, reference being had therein to the accompanying drawing.

This invention relates to hose couplers, and the objects of my invention are to provide positive and reliable means, in a manner as will be hereinafter set forth, for quickly connecting the confronting ends of two sections of hose, and to provide similar means that can be employed for quickly connecting a hose to a fire hydrant or plug.

Further objects of the invention are to obviate the necessity of using screw threads, set screws and bolts for connecting a hose to a fire plug or hydrant, and to provide a coupler that is simple in construction, durable and efficient for the purposes for which it is intended.

I attain the above objects by a mechanical construction that will be hereinafter specifically described and then claimed, and reference will now be had to the drawing, wherein:—

Figure 1 is a longitudinal sectional view of the coupler in connection with a fire plug or hydrant, Fig. 2 is an enlarged plan of the coupler, and Fig. 3 is an end view of the same.

A coupler in accordance with this invention comprises two cylindrical members 1 and 2, the latter telescoping the former. The member 1 has the inner end thereof provided with an annular rim 3, and the inner walls of said member are screw threaded, as at 4, whereby said member can be mounted upon the exteriorly threaded fitting 5 of a fire hydrant or plug 6. The outer end of the member 1 has the periphery thereof provided with diametrically opposed yokes 7 for a purpose that will presently appear.

The cylindrical member 2 has the inner end thereof provided with an annular rim 8 and the outer end of this member is adapted to be suitably attached to a hose (not shown). The inner end of the member is provided with two diametrically opposed bayonet-shaped slots 9 and the inner wall 10 of said slots is provided with a small projection 11. The distance between the projection 11 and the outer wall 12 of the slot 9 is sufficient to provide clearance for the yokes 7 when one member is shifted relatively to the other.

The member 2 intermediate the ends thereof is provided with diametrically opposed inwardly projecting lugs 13 and movably mounted in these lugs are the outer ends of bolts 14, the inner ends of said bolts extending through openings 15 provided therefor in a collar 16. Encircling the bolts 14 are coiled compression springs 17 and these springs are adapted to normally hold the collar 16 in engagement with the inner end of the member 1, thereby retaining the yokes 7 in engagement with the inner walls 10 of the slots 9.

To remove the member 2 from the member 1, it is necessary to push inwardly upon the member 2 until the projections 11 are moved out of the yokes 7. The member 2 can then be rotated to the right to bring the longitudinal portions of the bayonet-shaped slots 9 into alinement with the yokes 7, when the member 2 will be released from the member 1. During the rotation of the member 2 relatively to the member 1, the springs 17 are retained under tension and these springs facilitate the removal of the member 2 from the member 1 after the projections 11 have been moved out of the yokes 7. The collar 16 within the member 2 is prevented from becoming displaced by the heads and nuts of the bolts 14.

The member 1 can be made permanent upon the hydrant or plug or upon the end of a section of hose when it is desired to connect two sections together.

From the foregoing it will be observed that a coupling between the two members can be easily and quickly made, thereby saving valuable time, particularly when connections are to be made for a fire.

What I claim is:—

1. In a hose coupler, a cylindrical hydrant member adapted to be detachably connected to a hydrant, a cylindrical hose member telescoping said hydrant member, diametrically opposed yokes on the periphery of the hydrant member, said hose member formed with diametrically opposed bayonet-shaped slots for the reception of said yokes, projections carried by said hose member and engaging in said yokes, a pair of inwardly arranged lugs carried by the hose member, a collar within the hose member and engaging the free end of the hydrant member, bolts movably mounted in said lugs and slidably connected to said collar, and springs interposed between said lugs and collar and surrounding said bolts.

2. A hose coupler comprising a cylindrical hydrant member adapted to be connected to a hydrant, a cylindrical hose member telescoping said hydrant member and provided with diametrically opposed slots, diametrically opposed yokes carried by the hydrant member and extending in said slots, projections carried by the hose member and engaging in said yokes, inwardly extending and diametrically opposed lugs integral with said hose member, a collar within the hose member and abutting against the free end of the hydrant member, bolts extending through said lugs and said collar, and springs surrounding said bolts and interposed between the collar and the lugs for maintaining said projections in said yokes.

In testimony whereof I affix my signature in the presence of two witnesses.

JAMES G. HAYMAKER.

Witnesses:
EFFIE HAYMAKER,
MAX H. SROLOVITZ.

Copies of this patent may be obtained for five cents each, by addressing the "Commissioner of Patents, Washington, D. C."